US009522843B2

(12) United States Patent
Yang et al.

(10) Patent No.: US 9,522,843 B2
(45) Date of Patent: Dec. 20, 2016

(54) APPARATUS AND METHOD FOR FABRICATING MICROCONTAINERS

(71) Applicant: NANYANG TECHNOLOGICAL UNIVERSITY, Singapore (SG)

(72) Inventors: Jinglei Yang, Singapore (SG); He Zhang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/654,368

(22) PCT Filed: Dec. 17, 2013

(86) PCT No.: PCT/SG2013/000539
§ 371 (c)(1),
(2) Date: Jun. 19, 2015

(87) PCT Pub. No.: WO2014/098770
PCT Pub. Date: Jun. 26, 2014

(65) Prior Publication Data
US 2015/0344356 A1 Dec. 3, 2015

Related U.S. Application Data

(60) Provisional application No. 61/745,251, filed on Dec. 21, 2012.

(51) Int. Cl.
C03C 15/00 (2006.01)
B65D 13/02 (2006.01)
(52) U.S. Cl.
CPC ............ *C03C 15/00* (2013.01); *B65D 13/02* (2013.01)

(58) Field of Classification Search
None
See application file for complete search history.

(56) References Cited

U.S. PATENT DOCUMENTS 2,620,069 A   12/1952 Wendt
4,111,798 A    9/1978 Peterson et al.
(Continued)

FOREIGN PATENT DOCUMENTS

CA       1206900 A       7/1986
WO    2014098770 A1      6/2014

OTHER PUBLICATIONS

Foreign Communication From a Related Counterpart Application, International Search Report and Written Opinion dated Feb. 14, 2014, International Application No. PCT/SG2013/000539 filed on Dec. 17, 2013.
(Continued)

*Primary Examiner* — Shamim Ahmed (57) ABSTRACT

An apparatus for fabricating microcontainers, the apparatus comprising: a mixer configured to contain a liquid and having a plurality of zones, the plurality of zones comprising: a reaction zone configured to contain a solution of an etching agent and a plurality of hollow glass beads for etching of the hollow glass beads therein; a sinking zone below and in fluid connection with the reaction zone and configured to allow separation of etched hollow glass beads from intact hollow glass beads therein by sinking of the etched hollow glass beads; and a collection zone below and in fluid connection with the sinking zone and configured to collect the etched hollow glass beads therein while minimizing over-etching in the collection zone.

15 Claims, 6 Drawing Sheets

(56) References Cited

U.S. PATENT DOCUMENTS

| | | | |
|---|---|---|---|
| 4,542,066 A | 9/1985 | Delzant | |
| 4,637,990 A | 1/1987 | Torobin | |
| 4,793,980 A | 12/1988 | Torobin | |
| 6,444,162 B1 | 9/2002 | Anshits et al. | |
| 6,518,330 B2 | 2/2003 | White et al. | |
| 2002/0079055 A1* | 6/2002 | Kim | C03C 15/00 156/345.11 |
| 2006/0014004 A1* | 1/2006 | Iwasa | G03G 7/0013 428/195.1 |
| 2009/0258441 A1* | 10/2009 | Flemming | G01N 33/54313 436/518 |
| 2010/0139320 A1 | 6/2010 | Schumacher et al. | |
| 2012/0027746 A1* | 2/2012 | Dorian | C12N 9/6429 424/94.64 |
| 2013/0045523 A1* | 2/2013 | Leach | B01F 13/0023 435/214 |

OTHER PUBLICATIONS

Y. Xie, et al., "Fabrication of hollow glass microspheres", Journal of Power Sources 196 (2011) 10727-10730.

He Zhang and Jinglei Yang: "Etched glass bubbles as robust micro-containers for self-healing materials", J. Mater. Chem. A, 2013, 1, 12715-12720.

Akunets AA, Basov NG, Bushuev VS, Dorogotovtsev VM, Gromov AI, Isakov AI, et al. Super-High-Strength Microballoons for Hydrogen Storage. International Journal of Hydrogen Energy. 1994;19(8):697-700.

Mcllroy DA, Blaiszik BJ, Caruso MM, White SR, Moore JS, Sottos NR. Microencapsulation of a Reactive Liquid-Phase Amine for Self-Healing Epoxy Composites. Macromolecules. 2010;43(4):1855-1859.

Jin H, Mangun CL, Stradley DS, Moore JS, Sottos NR, White SR. Self-healing thermoset using encapsulated epoxy-amine healing chemistry. Polymer. 2012;53(2):581-587.

Yang JL, Keller MW, Moore JS, White SR, Sottos NR. Microencapsulation of Isocyanates for Self-Healing Polymers. Macromolecules. 2008;41(24):9650-9655.

Huang M, Yang J. Facile microencapsulation of HDI for self-healing anticorrosion coatings. Journal of Materials Chemistry. 2011;21(30):11123-11130.

Huang M, Zhang H, Yang J. Synthesis of organic silane microcapsules for self-healing corrosion resistant polymer coatings. Corrosion Science. 2012;65(0):561-566.

Miller I. Alkali etching of glass, in the issue of Pushing the Envelope published by the Ontario Building Envelope Council, 2011.

Newell JD, Patankar SN, Edwards DB. Porous microspheres as additives in lead-acid batteries. Journal of Power Sources. 2009;188(1):292-295.

Xiao DS, Yuan YC, Rong MZ, Zhang MQ. Hollow polymeric microcapsules: Preparation, characterization and application in holding boron trifluoride diethyl etherate. Polymer. 2009;50(2):560-568.

* cited by examiner

APPARATUS AND METHOD FOR FABRICATING MICROCONTAINERS

CROSS-REFERENCE TO RELATED APPLICATIONS

This application is a national stage under U.S.C. 371 of International Application No. PCT/SG2013/000539 filed on Dec. 17, 2013 and entitled, "AN APPARATUS AND METHOD FOR FABRICATING MICROCONTAINERS" which claims priority to U.S. Provisional Application No. 61/745,251 filed Dec. 21, 2012 and entitled "AN APPARATUS AND METHOD FOR FABRICATING MICROCONTAINERS," both of which are incorporated herein by reference in their entirety for all purposes.

FIELD OF THE INVENTION

This invention relates to an apparatus and method for fabricating microcontainers, in particular to microcontainers comprising etched hollow glass beads.

BACKGROUND OF THE INVENTION

Definitions of some of the technical terms used in the rest of the specification are given below.

A polymer is a class of materials having structures that contain repeating structure units covalently bonded to each other. The repeatable structure units, which are called monomers, can be identical or different from each other. The reaction from the monomers to form the corresponding polymer is called polymerization.

A hardener/curing agent is a chemical substance or mixture added to a resin to harden it by forming a polymer. Generally, it will promote or control the hardening or curing reaction of the resin. An agent which does not enter into the reaction is known as a catalytic hardener or catalyst. A reactive curing agent or hardener is generally used in much greater amounts than a catalyst, and actually enters into the reaction.

"Self-healing" is the ability to repair damage and restore lost or degraded properties or performance of a material using resources inherently available to the system. This concept is inspired by biological systems which can heal themselves after being wounded. Currently this function is mainly realized in polymer-based materials by either the incorporation of heterogeneous healing carriers or by molecular design. Materials which have a self-healing functionality are called self-healing materials. The first generation of self-healing material was patented in the United States of America and given U.S. Pat. No. 6,518,330 B2.

"Anticorrosion" is the ability to prevent metal or alloy surfaces from corrosion or to retard the corrosion process of the metal surfaces in a corrosive environment. Anticorrosion can be achieved through surface treatment physically or chemically. The anticorrosion species are one class of chemicals which are adopted to realize the retardation of corrosion by forming new materials on the metal surface first before corrosion happens.

Hollow glass beads (HGBs) are a newly developed material made of borosilicate glass with a thin shell and a relatively high cavity volume. Because of their excellent properties, such as low density, low thermal conductivity, high strength and good chemical stability, they have been extensively applied in areas ranging from aerospace to high-speed train to sports equipment. After modification of their hydrophilism, they can be easily and readily incorporated into polymeric matrices to achieve composites with special properties.

Because of their relatively high volume cavities inside the shell, HGBs can be adopted as gas carriers for some simple and small molecules. In 1994, Akunets et al [1] reported the storage of hydrogen using hollow glass balloons with relatively thicker shells because the pressure inside is very huge. Since the hydrogen molecule is very small and it is the simplest molecule, they can diffuse into the cavity through the dense wall under special circumstance. HGBs can be also filled with neon or deuterium to be applied in the laser fusion area. However, when intact HGBs are used without modification, the filling process involving high temperature up to 300° C. and high temperature up to 100 MPa is very challenging and not feasible for large scale applications.

Given the good properties of HGBs, such as high strength, good chemical inertness and thermal stability, they could also be adopted as potential microcontainers for various substances, including reactive chemicals, anticorrosive species, catalyst, drug, etc. In this field, it is required to have ready and easy loading of the desired chemicals in their preferred states with controllable release rate of the loaded chemicals from the container. As mentioned above, without modification of the shell structure, the filling of HGBs with liquid or solid is much more difficult even under high temperature and high pressure for long time. The direct fabrication of the porous shell HGBs is an alternative method to produce this kind of containers (US20100139320, U.S. Pat. No. 4,637,990, and U.S. Pat. No. 4,793,980). However, because the porous shells fabricated in these prior art methods have only nano-channels or subnano-channels, the filling and the release of this kind of porous HGBs are still issues of concern.

After proper modification of their shell structure, HGBs might be used as microcontainers for highly reactive agents for self-healing materials, including composites and coatings. Self-healing is the ability to recover the functionality for the materials without human intervention, which is being deeply investigated since the last decade. Among the developed mechanisms for self-healing, the microencapsulation of reactive healants is a major approach. Mature methods employing microcapsules to fulfill the self-healing functionality include the use of dicyclopentadiene (DCPD)/Grubb's catalyst, polysiloxane/tin catalyst, diisocyanate, epoxy/hardener, etc. As epoxy resin is widely used as matrix material for composites for protection and for adhering the reinforcements because of its excellent physical and chemical properties, self-healing of the brittle epoxy matrix is attracting more and more attentions. Use of epoxy-amine two part healing chemistry is preferable in epoxy based composites, which can keep excellent materials compatibility and low cost. However, the fabrication of healing containers with primary amines is very difficult due to their reactive feature and ease of solubility in most solvents. In existing epoxy-hardener systems, some secondary classes of hardeners, like polythiol, latent catalysts, cationic catalysts, were explored rather than the major class, primary amines and their derivatives. The direct microencapsulation of diethylenetriamine (DETA) was indeed reported by McIlroy et al [2]. However, their usage to realize the self-healing functionality has not yet materialized. Recently, Jin et al. [3] reported microcapsules containing an amine derivative using a two-step method by first synthesizing hollow polymeric microcapsules and then loading them with the amine via vacuum infiltration. However, the long-term stability of the polymeric shell was diminished by the corrosive amine and the thermal stability of the loaded amine under elevated temperature still needs further improvement. How to fabricate the healing containers for highly reactive and corrosive amines with reasonable stability is a breakthrough that will advance the more practical healing chemistry in the field.

Self-healing coatings by the incorporation of microcapsules containing healants, such as diisocyanates [4, 5] and polysilane [6], have been explored recently. The mechanism for these functional coatings lies in that the encapsulated healants can react with water to form a solid material in the damaged area to impede or even prevent the corrosion of the coated substrates. As isocyanates can react with reagents with active hydrogen atoms, such as polyols to form polyurethane, polyamine to form polyurea, or just water and moisture, it is a challenge to encapsulate the diisocyanates. Up to now, the successful microencapsulation of diisocyanates was only reported by the Yang group when they used interfacial polymerization of isocyanate prepolymers with diol to encapsulate isophorone diisocyanate (IPDI) and hexamethylene diisocyanate (HDI), as filed in U.S. Patent application No. 61/593,530. However, the high permeability of the loose polymeric shell of the microcapsules limits their application because the solvent or any compounds with active hydrogen atoms in the surroundings would deactivate the reactive diisocyanate.

The modification of HGBs can be an alternative way to fabricate the microcontainers for anticorrosive species, drugs, as well as healants, given the properties of the glass shell. Two potential etching methods can be used to achieve the modified HGBs: concentrated alkaline solution such as potassium hydroxide under elevated temperature or diluted hydrofluoric acid (HF) solution at room temperature. Because the etching process using the alkaline solution is very slow [7], the second method using diluted HF solution seems more attractive. To improve the performance of the lead-acid battery by rapidly transportation of the electrolyte, Newell et al. [8] etched the HGBs as the vehicles for the electrolyte by directly putting HGBs into diluted HF solution and shaking the mixture for a certain time. However, this is not a controllable process for the HGBs. It acts in an undesirable manner as through-shell etching of the HGBs will accelerate the etching of already well-etched beads because the etching reaction would take place both outside and inside the HGBs, leading to over-etching.

SUMMARY OF INVENTION

The method and apparatus disclosed in this application offer controllable modification of commercially available hollow glass beads (HGBs). More specifically, it provides a method for controllable etching of HGBs with diluted 1% hydrofluoric acid (HF) aqueous solution using a specially designed mixer for the etching process. In this way, controllable etching of HGBs with a few micron meter holes in the dense shell can be obtained. After the modification process, HGBs are still robust, thermally stable, and chemically inert. Therefore, they can be used as universal microcontainers for many substances for different applications, such as self-healing materials, corrosion protection coatings, drug or chemical delivery with controlled release purposes, etc.

The method also provides a process for filling the microcontainers of etched HGBs with various liquid solutions or solid chemicals for a wide number of applications. As a detailed embodiment of the loaded etched HGBs, the etched HGBs filled with amine solution described herein are uniformly dispersed into an epoxy matrix containing microcapsules with epoxy solution. The healing behaviour is characterized by the recovered fracture toughness using a tapered double-cantilever beam (TDCB) specimen. Another embodiment of the etched HGBs is the self-healing coating based on the UV-curable adhesive, NOA 61, when the adhesive is mixed with etched HGBs loaded with diisocyanate. The healing performance of the applied coating is assessed by immerging the cross scratched specimen into 1 M sodium chloride (NaCl) solution for certain period, and compared with the control specimen under the same treatment.

According to a first aspect, there is provided an apparatus for fabricating microcontainers, the apparatus comprising: a mixer configured to contain a liquid and having a plurality of zones, the plurality of zones comprising: a reaction zone configured to contain a solution of an etching agent and a plurality of hollow glass beads for etching of the hollow glass beads therein; a sinking zone below and in fluid connection with the reaction zone and configured to allow separation of etched hollow glass beads from intact hollow glass beads therein by sinking of the etched hollow glass beads; and a collection zone below and in fluid connection with the sinking zone and configured to collect the etched hollow glass beads therein while minimizing etching in the collection zone.

The reaction zone may be provided with a stirrer configured to agitate the solution and the plurality of hollow glass beads.

The apparatus may further comprise a separator configured to minimize flow of solution between the sinking zone and the collection zone, the separator having at least one tubule configured to allow passage of the etched hollow glass beads therethrough from the sinking zone to the collection zone.

The apparatus may further comprise an outlet provided at the collection zone for removal of the etched hollow glass beads from the collection zone.

The apparatus may further comprise a number of separation meshes and barriers configured to inhibit liquid circulation in the sinking zone.

The apparatus may further comprise a liquid leveller configured to allow drainage of excess solution in order to maintain a level of the solution in the mixer.

According to a second aspect, there is provided a method of fabricating microcontainers, the method comprising the steps of: etching a plurality of hollow glass beads in a solution of an etching agent in a reaction zone of a mixer; separating etched hollow glass beads from intact hollow glass beads in a sinking zone of the mixer by allowing the etched hollow glass beads to sink in the solution; and collecting the etched hollow glass beads in a collection zone of the mixer while minimizing etching in the collection zone.

The method may further comprise agitating the solution and the plurality of hollow glass beads during the step of etching.

The method may further comprise minimizing flow of solution between the sinking zone and the collecting zone via a separator provided in the mixer and passing the etched hollow glass beads through a tubule of the separator from the sinking zone to the collection zone.

The method may further comprise inhibiting liquid circulation in the sinking zone during the step of separating.

The method may further comprise draining excess solution in order to maintain a level of the solution in the mixer.

The method may further comprise rinsing the collected etched hollow glass beads to remove residual etching agent and drying the etched hollow glass beads.

The method may further comprise filling the etched hollow glass beads with a desired substance.

The step of filling may comprise vacuum evacuating the etched hollow glass beads in a vessel, adding the desired substance as a solution into the vessel containing the vacuum evacuated etched hollow glass beads to form a mixture, and filtering the mixture to obtain the microcontainers comprising etched hollow glass beads filled with the desired substance.

Alternatively, the step of filling may comprise adding the etched hollow glass beads into a vessel containing a solution of the desired substance, allowing the solution of the desired substance to enter the etched hollow glass beads, removing etched hollow glass beads that have been filled with the solution of the desired substance from the vessel, and evaporating a solvent of the solution of the desired substance to obtain microcontainers comprising etched hollow glass beads filled with the desired substance.

According to a third aspect, there is provided microcontainers comprising etched hollow glass beads fabricated according to the method of the second aspect.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIGS. 9(a), (b), (c) are images of a same scratched specimen having a control coating immersed in NaCl solution at 0 day, 2 days, and 4 days, respectively;

FIGS. 9(d), (e), (f) are images of a same scratched specimen having a self-healing coating immersed in NaCl solution at 0 day, 2 days, and 4 days, respectively;

DETAILED DESCRIPTION

Exemplary embodiments of the invention will be described with reference to FIGS. 1 to 12 below.

FIGS. 1 to 4 show different exemplary embodiments of a specially designed reactor 100 for the reaction of HGBs 10 with diluted HF solution 99 in an aqueous solution 90 in order to fabricate microcontainers using HGBs with through holes. In the figures, equivalent components have been referenced with the same reference numeral for ease of understanding.

Figure 1:
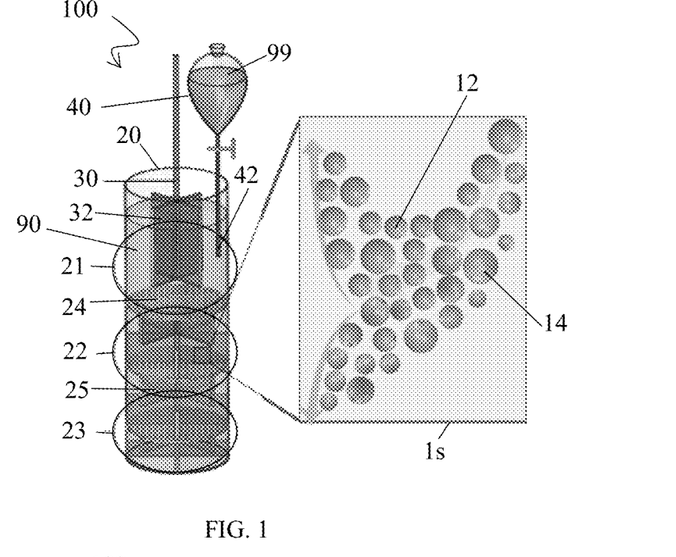
FIG. 1 is a first exemplary embodiment of a reactor for fabricating microcontainers.

FIG. 1 shows a first embodiment of the reactor 100 which comprises a mixer 20 configured to contain a liquid and having three different zones 21, 22, 23 for different functions. These zones include a top reaction zone 21 provided with gentle agitation means 30 for etching the HGBs 10 in a solution therein. An etching agent of diluted HF solution 99 is slowly fed into the reaction zone 21 and depleted during the etching process under agitation. There is also a middle sinking zone 22 below and in fluid connection with the reaction zone 21 for separation of intact beads 12 and the etched ones 14, and a collection zone 23 below and in fluid connection with the sinking zone 22 for deposition of well-etched beads (not shown) and where the solution is almost free of HF without circulation so as to minimize etching in the collection zone 23.

A plastic separation funnel 40 modified with a plastic extension tip 42 immersed into the aqueous solution 90 of the mixture can serve as a feeder 40 to feed the diluted HF solution 99 into the mixer 20 gradually and continuously. Compared to traditional propeller with several blades for agitation, the agitation device 30 comprising a specially designed stirrer 30 is provided with four curved panels 32 to generate a relatively high driving force for good circulation under a lower stirring rate.

As it is undesirable to have liquid circulation in the sinking zone 22 and the collection zone 23, separation meshes 24 and barriers 25 may be provided in the sinking zone 22 to inhibit liquid circulation in order to allow the etched HGBs 16 to sink under gravity. The barriers 25 may be arranged in the form of cross barriers as shown in FIGS. 1 to 4.

Figure 12:
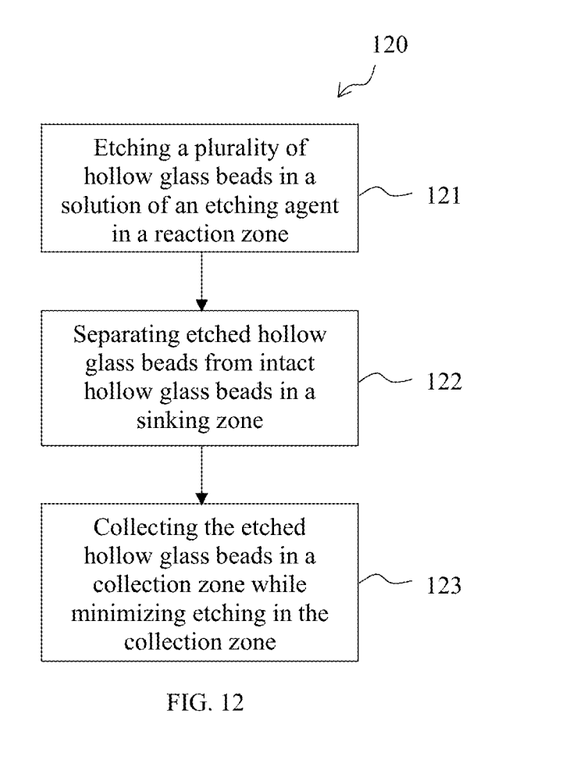
FIG. 12 is a flow chart illustrating an exemplary method of fabricating the microcontainers.

The etching process 120 starts by feeding the specially designed mixer 20 with deionized (DI) water and HGBs 10 into the reaction zone 21. Then the diluted HF solution 99 as etching agent for the HGBs is charged into the plastic feeder 40 and fed into the mixer 20. The feed rate of the HF solution 99 was adjusted after commencement of the gentle agitation using the agitator 30. As shown in FIGS. 1 and 12, the HGBs 10 are circulating in the reaction zone 21 of the mixer 20 as driven by the agitation of the stirrer 30 when they are being etched by the diluted HF solution 99 in the reaction zone 21, 121. As the reaction progresses, the well-etched HGBs 16 filled with aqueous solution are separated from the intact HGBs 12, 122 as they sink in the sinking zone 22, under the action of gravity. Etched HGBs subsequently deposit and are collected onto the bottom of the collection zone 23, 123.

Preferably, the system is allowed to run further for some time after finishing feeding of the HF solution 99 in order to fully deplete the residual HF 99 in the mixer 20 and to improve the yield of the process. Subsequently, the well-etched HGBs 16 at the collection zone 23 are collected and rinsed for several times to further remove any residual HF 99. After drying at room temperature, the collected etched HGBs 16 are water-deposited for several times to remove any debris of broken glass that may have resulted from the stirring-etching process. Water-deposition here means to immerse or place the HGBs in a large amount of water in a separation funnel for a long time and to dispose of deposition which contains broken HGBs. Only the intact HGBs floating on the water are collected and dried as the desired product comprising well-etched HGBs.

Because of the significant density mismatch between the intact HGBs 12 and the etching solution 90, after being circulated to the sinking zone 22, the intact HGBs 12 will flow back up to the reaction zone 21 rather than sink down and deposit onto the bottom collection zone 23. As etching progresses, some of the HGBs would be etched through to form small throughholes on their glass shells, leading to the infiltration of the solution 90 into these HGBs. With the increasing volume of the infiltrated solution 90 taken into the etched HGBs 14, the density of the beads 14 will increase. When the density of the etched beads 16 is greater than the solution 90, they 16 will sink down and deposit at the bottom of the mixer 20, thus avoiding being over-etched. The three different zones 21, 22, 23 thus serve to isolate the well-etched HGBs 16 from additional etching on both outside and inside their shells by the HF solution, in contrast with the etching process in a traditional single-compartment mixer which results in over-etching of the HGBs.

Using this system, the etching of HGBs (or formation of holes in HGBs) can be controlled by the smart design with three different zones 21, 22, 23 in the mixer 20 for the circulation of the intact HGBs 12 and deposition of the well-etched ones 16. The schematic diagram is on the right demonstrates the circulation and the separation of the beads 10 during the etching process under agitation in the sinking zone 22. As can be seen, intact beads 12 tend to rise in the HF solution while etched beads 14 sink due to infiltration of the aqueous solution into the etched HGBs 14 through the etched holes which increases the density of the etched beads 14 and result in the deposition of the well-etched beads 16 to the collection zone 23. Thus, it will prevent the infiltration of HF solution 99 into the well-etched HGBs 16 because the well-etched HGBs 16 deposit to and are isolated in the still collection zone 23 rather than in the reaction zone 22 where HF concentration is relatively high. Thus, further etching is prohibited or minimized since the collection zone 23 is relatively free from HF in the aqueous solution. The mixer 20 is thus configured to contain decreasing concentration of the etching solution from the reaction zone 21 to the collection zone 23.

Preferably, prior to etching the HGBs 10 in the reactor 100, the HGBs are sieved to narrow down the size distribution so that only similar sized HGBs are etched. The sieved HGBs are then water-deposited several times to remove debris and broken ones. HGBs floating on the water top were collected and dried at room temperature (RT, 20° C.) completely. In this way, only unbroken HGBs of a similar sized are obtained for further use.

Etching Example 1

In this example, HGBs are etched using the mixer 20 as shown in FIG. 1. First, 550 ml DI water and 2.0 g HGBs 10 are added into the mixer 20. 150 ml 1% HF solution 99 is charged into the plastic feeder 40. The HGBs 10 are gently stirred at 50 rpm for the reaction with the diluted HF and for their circulation in the reaction zone 21 of the mixer 20. While the mixture in the mixer 20 is stirred, the HF solution 99 is slowly fed into the mixture 20 with a rate at about 35-40 drops/min. After about 12 hours, most of the HGBs 10 will be etched well and deposit at the collection zone 23. The etched HGBs 16 are rinsed with water several times to remove any residual HF, separated, and finally completely dried at room temperature. The dry HGBs are preferably water-deposited several times to remove debris. The HGBs floating on the water top are collected and dried as the target product.

Figure 2:
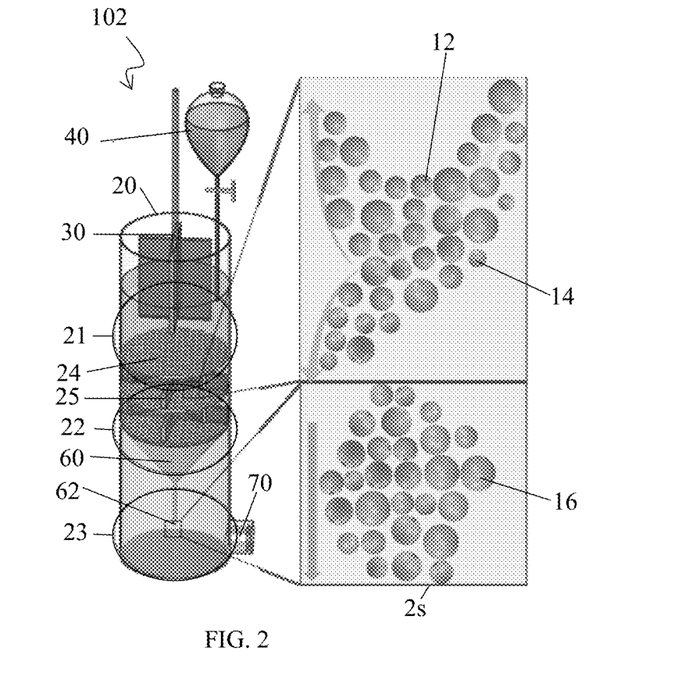
FIG. 2 is a second exemplary embodiment of a reactor for fabricating microcontainers.

FIG. 2 illustrates a design of a second exemplary embodiment of the reactor 100 for better isolation of the collection zone 23 from the other zones 21, 22. Compared to the reactor of the first embodiment 101 as shown in FIG. 1, in the second embodiment 102, a funnel-like component or separator 60 is inserted into the mixer 20 between the collection zone 23 and the sinking zone 22 for passage of the well-etched HGBs 16 there through. The upper edge of the separator 60 is adhered to the inner wall 25 of the mixer 20 for better isolation. The funnel-shaped separator 60 has a tubule 62 with a tip having a small radius that allows the deposition of the well-etched HGBs 16 from the sinking zone 22 to the collection zone 23 while minimizing flow of the HF solution 99 between the two zones 22, 23. A small outlet 70 is provided at the base of the mixer 20 for the removal of the well-etched HGBs 16 from the collection zone 23. The schematic diagram 2s on the right illustrates the movement of HGBs 10 in the separation or sinking zone 22 and the collection zone 23 respectively.

Etching Example 2

In this example, the reactor 100 shown in FIG. 2 is adopted to etch the HGBs. Since the collection zone 23 is nearly isolated from the two top zones 21, 22, it is necessary to first fill the collection zone 23 with DI water through the outlet 70 at the bottom of the mixer 20. After the filling of the collection zone 23, the procedure and the parameters for etching the HGBs are the same as those in example 1.

Figure 3:
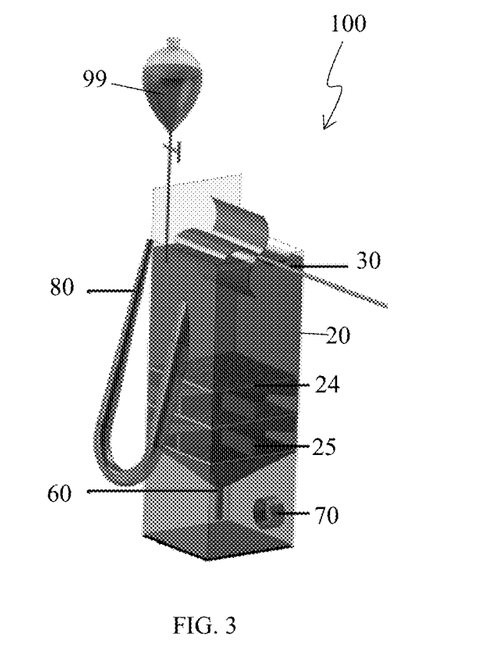
FIG. 3 is a third exemplary embodiment of a reactor for fabricating microcontainers.

FIG. 3 shows a third exemplary embodiment of the reactor 100 using the same principle to etch HGBs. In this variant, a square or rectangular mixer 20 is adopted to replace the round or cylindrical mixer of the first 101 and second 102 embodiments, and a tapered U-shape outlet or liquid leveller 80 with adjustable height is provided to drain excess solution or remove the added solution 99 gradually to maintain the solution level in the mixer 20 while avoiding the flowing away of the HGBs 10. Different from the system in FIGS. 1 and 2, the propeller 50 is designed to stir the solution 99 in the mixer 20 in the perpendicular direction. With this reactor, the stirring speed can be reduced as much as possible to avoid the breaking of the HGBs during etching.

Etching Example 3

In this example, the reactor in FIG. 3 is adopted to etch the HGBs. Firstly, the collection zone 23 is filled with DI water through the outlet 70 at the bottom, and the two top zones 21, 22 are filled with enough DI water and 2.0 g HGBs from a top opening of the mixer 20. The height of the U-shape outlet 80 is adjusted to drain away extra water to ensure that the solution 90 cannot come out from the top opening while the propeller 30 is able to stir the solution 90. The propeller 30, which is perpendicular to the axis of the mixer, is then lowered down to stir the mixture at 40 rpm. The other procedure and parameters for etching the HGBs are kept the same as those in example 1.

Figure 4:
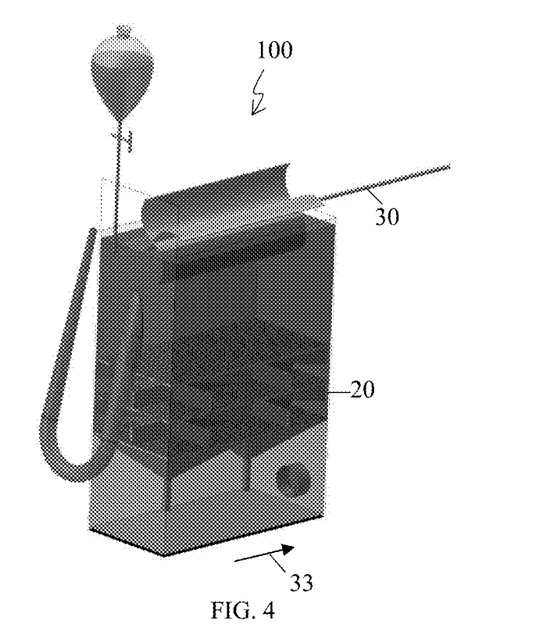
FIG. 4 is a fourth exemplary embodiment of a reactor for fabricating microcontainers.

It should be noted that the reactor 100 is easy to be modified for scale-up production. FIG. 4 is a fourth exemplary embodiment of the reactor 100 that gives a new modification based on the system as described in FIG. 3. The mixer 20 is elongated along the axial direction of the propeller 30 as shown by the arrow 33. Accordingly, the separator 20 is similarly elongated and provided with two tubules 62 that are spaced apart on the separator 20 for passage of the etched HGBs from the sinking zone 22 to the collection zone 23. By this improvement, more HGBs 10 in one batch can be etched without decreasing the yield, thereby providing one way to solve the scale-up problem.

Figure 5:
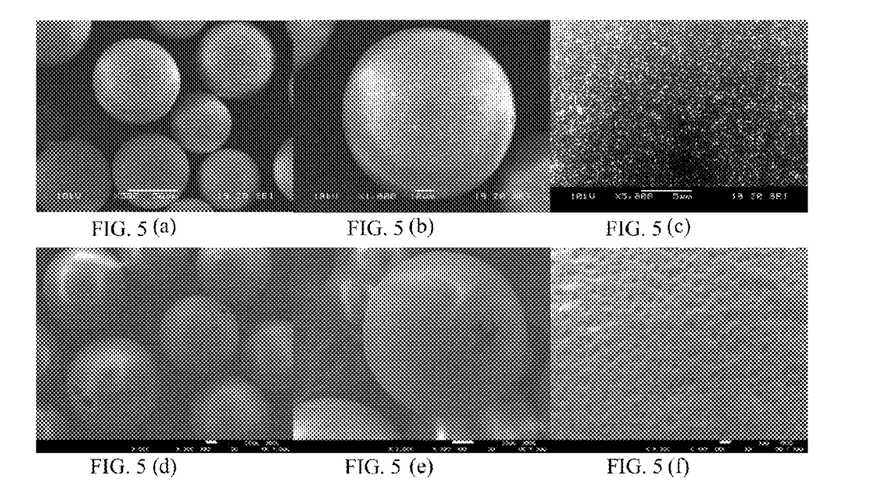
FIG. 5(a) is an SEM image of intact HGBs before etching.
FIGS. 5(b) and 5(c) are enlarged SEM images of the morphology of an intact HGB.
FIG. 5(d) is an SEM image of etched HGBs.
FIGS. 5(e) and 5(f) are enlarged SEM images of the morphology of an etched HGB.

FIG. 5 illustrates the HGBs 10 before and after the etching process. FIG. 5(a) shows a typical SEM image for the original HGBs 10 before etching. FIGS. 5(b) and 5(c) display the enlarged morphology images of an intact HGB 12. FIG. 5(d) provides an overview of the etched beads 16. FIGS. 5(e) and 5(f) present the enlarged morphology images of an etched HGB 16.

The etched HGBs 16 are now formed as microcontainers and may then be filled with a desired substance.

Figure 6:
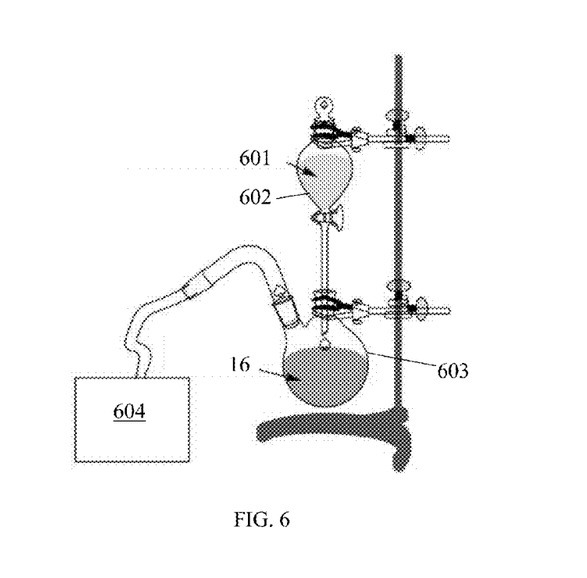
FIG. 6 shows an exemplary device for vacuum assisted filling of etched HGBs.
Figure 7:
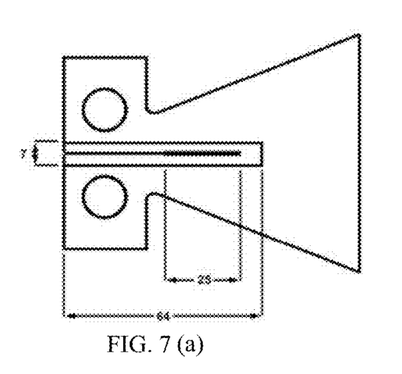
FIG. 7(a) illustrates the geometry of a self-healing tapered double-cantilever beam specimen.
FIG. 7(b) shows typical load versus displacement curves for TDCB specimens before and after self-healing.

An exemplary method to fill the etched HGBs with a desired substance in the form of a solution 601 may be carried out using an exemplary device as shown in FIG. 6 which uses a vacuum-assisted method for filling the etched HGBs with the desired solution 601. The solution 601 to be loaded is stored in a separation funnel 602. The etched HGBs 16 are placed in an appropriate vessel such as a two-neck flask 603 connected to the funnel 602. The solution 601 is passed into the two-neck flask 603 via an inlet of the flask 603 while an outlet of the flask 603 is connected to a vacuum pump 604. Etched HGBs 16 that have been filled with the desired solution 601 may then be used in the preparation of self-healing materials, as will be described below.

Self-Healing Materials

Self-healing is a new concept developed in the last decade. Many healing mechanisms have been explored since then, including the incorporation of microcapsules containing reactive healants, the embedding of hollow tubes or 3-D microvascular networks, molecular design, and so on. Among them, microencapsulation of healants is a main stream method due to its ease of manufacturing and dispersion process. Although several microencapsulation systems are established, obtaining homogeneous healing of microcracks in polymer resins is still a challenge because direct microencapsulation of the most widely used hardeners for epoxy, including amines and amine derivatives, is currently facing a bottleneck situation.

By contrast, the etched HGBs described above have good potential as containers for the amine-based hardeners for epoxy because glass is compatible with amines due to its chemical inertness. Considering that the epoxy resins are one of the major matrices in the engineering materials and structures due to their excellent physical and chemical properties, realizing a self-healing functionality in epoxy-based materials and composites will provide significant benefits in reducing maintenance and repair costs and in extending the service life of those materials.

Loading of the Etched HGBs with Amines for Preparation of an Exemplary Self-Healing Material The filling of the etched HGBs 16 with amines can be realized using the vacuum-assisted technique using the device shown in FIG. 6. First, the etched HGBs 16 are charged into a suitable vessel such as the two-neck flask 603 with one end or outlet connected to the vacuum pump 604 and the inlet connected to the separation funnel 602 to add the desired amine solution 601. After about 30 min of evacuation, the outlet connected to the vacuum pump 604 is blocked and excess amine solution 601, comprising diethylenetriamine (DETA) and 2,4,6-tris(dimethylaminomethyl) phenol (DMP 30) with ratio of 9:1, is added into the flask 603 through the separation funnel 602. After about 30 min, the mixture of etched HGBs 16 and amine solution 601 in the flask 603 is separated using a funnel lined with a filter paper. The residual amine solution is further absorbed away by putting some tissue paper on the outside of the filter paper. Etched HGBs filled with amine are obtained and ready for incorporating into an epoxy resin without further rinsing required in order to form the exemplary self-healing material.

Preparation of the Exemplary Self-Healing Material and TDCB Specimen for Fracture Toughness Testing and Characterization of Healing Behaviour To form the first exemplary self-healing material, the etched HGBs filled with amine solution that have been prepared as described above were uniformly dispersed into an epoxy matrix containing microcapsules with epoxy solution. An exemplary method is as follows: Epolam 5015 and hardener 5015 at the ratio recommended by the supplier are mixed completely to form a mixture. Then, 3.0 g microcapsules with 80 wt % Epolam 5015 in ethyl phenyl acetate (EPA) are dispersed uniformly into the mixture. After that, the mixture containing epoxy and the microcapsules is degassed to remove air bubbles for about 15 min. Subsequently, 6.0 g of etched HGBs loaded with amine are added into the mixture containing epoxy and the microcapsules and agitated gently for dispersion. The final mixture of epoxy, microcapsules and etched HGBS loaded with amine is poured into short grooved pure epoxy tapered double-cantilever beam (TDCB) frames, as shown in FIG. 7(a). The specimens are cured at room temperature for 24 hours followed by post-cure heating at 35° C. for another 24 hours.

The healing behaviour of the self-healing material was characterized by the recovered fracture toughness using the TDCB specimen made from the self-healing material in a mode I fracture toughness test.

A pre-crack is induced by a sharp blade in each TDCB specimen before the fracture toughness testing. An overhead loading speed of 1 mm per minute is adopted in the testing. After fracture of the specimens, they are healed at a temperature of 35° C. for 24 hours. The fracture toughness testing of the healed specimen is conducted using the same parameters for comparison.

Figure 8:
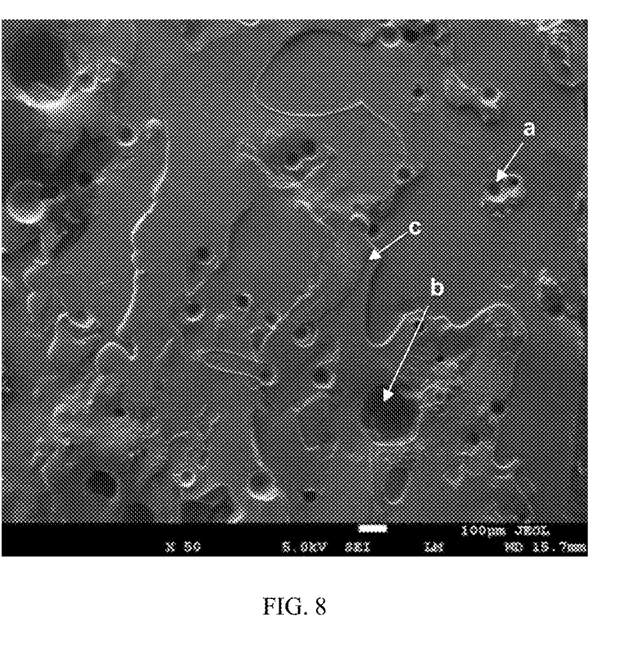
FIG. 8 is an SEM image of a profile of the healed fracture surface of a TDCB specimen.

FIG. 7(a) illustrates the geometry of the self-healing TDCB specimen prepared using the self-healing material. FIG. 7(b) shows typical load versus displacement curves for the TDCB specimens before and after self-healing process. For a given specimen healed at 35° C. for 24 hours, the healing efficiency defined by ratio of the recovered fracture toughness to the original fracture toughness was about 50%. The SEM image in FIG. 8 depicts a profile of the healed fracture surface of the TDCB specimen. Arrows a and b indicate a ruptured HGB containing amine hardener and a ruptured microcapsule containing epoxy solution in the fracture surface respectively. Arrow c indicates a new epoxy thin film on the fracture surface formed by the released epoxy resin and amine hardener from their corresponding microcontainers a and b containing the healing agents respectively.

Corrosion Protection and Self-Healing Coatings

In the area of corrosion protection, the presently disclosed technique can also play a major role. It is well reported that the direct economic cost for corrosion protection is in the range of 1-5% gross domestic product (GDP) of each nation. Protective coatings for corrosion control of steel structures such as offshore platforms, bridges and underground pipelines take a major share of the corrosion cost. However, the surface layer is always at high risk of damage during transportation, installation and service. By offering protective coatings with such functionalities as self-healing or sustainable release of anticorrosion species, additional corrosion protection can be achieved. The etched HGBs described above can act as microcontainers either for the healants to autonomously seal damage in coatings or for the corrosion inhibitors to retard corrosion process through coatings. Etched HGBs with different sizes can provide a versatile and promising future for fabricating self-healing anticorrosive coatings.

Loading of the Etched HGBs with Diisocyanates for Preparation of a Self-Healing Coating The etched HGBs 16 may be filled with diisocyanates, for example, 2,4-toluene diisocyanate (TDI), using the vacuum-assisted technique described above with reference to FIG. 6. First, the etched HGBs 16 are charged into a suitable vessel such as the two-neck flask 603 with one end or outlet connected to the vacuum pump 604 and the inlet connected to the separation funnel 602 to add the desired TDI solution 601. After about 30 min of evacuation, the outlet connected to the vacuum pump 604 is blocked and excess TDI is added into the flask 603 through the separation funnel 602. After about 30 min, the mixture of etched HGBs 16 and TDI is separated using a funnel lined with a filter paper (not shown). The residual TDI is further absorbed away by putting some tissue paper on the outside of the filter paper. Etched HGBs filled with TDI are obtained and ready for incorporating into a polymer matrix without further rinsing required in order to form the exemplary self-healing coating.

Preparation of the Exemplary Self-Healing Coating and the Characterization of Self-Healing Behaviour To prepare the self-healing coating, an ultraviolet (UV) curable adhesive, NOA 61, was chosen as a coating material and carbon steel was selected as a substrate. Before applying the coating, the steel substrates were abraded with sand paper having a grain size of 400, rinsed three to four times with deionized water, washed with acetone for degreasing, and finally dried using an air gun. The coating was made from a coating mixture formulated with 18 g NOA 61 mixed well with 2 g etched HGBs loaded with TDI (10 wt %) as described above. After the coating mixture had been degassed under moderate vacuum for about 10 min, the coating mixture was applied onto the carbon steel with a coating thickness of about 300 µm. The applied coating was UV-cured in a UV oven under 50% intensity for 240 s.

Cross scratches were manually made in the coating using a razor blade according to ASTM D1654 standard. After properly sealing the edges of the specimens to avoid corrosion from the edges, the scratched specimens were immerged in 1 M NaCl aqueous solution for a certain period to assess the accelerated corrosion. Digital photos were taken to record the corrosion level for comparison. Control specimens were fabricated using pure NOA 61 without HGBs to form the coating with the same processing conditions and treated by the same manner in the corrosion test for comparison.

Figure 9:
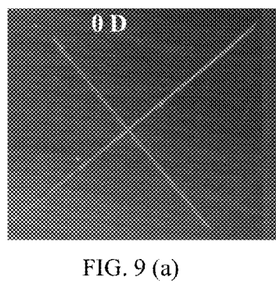

The digital images in FIG. 9 show the self-healing ability of the scratched NOA 61 coating mixed with 15 wt % HGBs loaded with 2,4-toluene diisocyanate (TDI) and immersed in 1 M NaCl solution for a certain period. FIGS. 9(a), (b), (c) are images of a same scratched specimen having a control coating with no healing carriers (i.e., etched HGBs) that was immersed in NaCl solution at 0 day, 2 days, and 4 days, respectively, while FIGS. 9(d), (e), (f) are images of a same scratched specimen having a self-healing coating that was immersed in NaCl solution for the same intervals. With the elapse of time, rust appeared gradually in the scratches of the control specimen while the scratches on the self-healing specimen kept an obvious rust-free status.

Loading of Etched HGBs with Anticorrosive Species 8-Hydroquinoline (8-HQ)

Instead of filling the etched HGBs with TDI, filling of the etched HGBs with solid 8-HQ can also be achieved for anticorrosion purposes. First, 2 g 8-HQ is added into 10 g acetone in a suitable vessel such as a small glass vial for the dissolution of this anticorrosive chemical. After complete dissolution is attained, a certain amount of etched HGBs is charged into the vial to form a mixture. The mixture is placed in an automatic shaker to ensure that most of the HGBs are immersed in the mixture. Because of the low viscosity of the anticorrosive solution, it can infiltrate slowly into the etched HGBs through the small holes etched on the shells of the HGBs. When the majority of the etched HGBS have been loaded with the solution of acetone and 8-HQ, they deposit on the bottom and are separated from the solution. After removal of the loaded etched HGBs from the solution and evaporation of the acetone from inside the shell of the loaded HGBs, only 8-HQ remains in the HGBs. The loaded HGBs containing 8-HQ are ready to be used in polymeric coatings for corrosion protection.

Loading of Etched HGBs with Anticorrosive Species 2-Mercaptobenzothiazole (2-MBT)

Alternatively, the etched HGBs may be filled with 2-MBT solution using the vacuum-assisted technique described above with reference to FIG. 6. First, the etched HGBs 16 are charged into an appropriate vessel such as the two-neck flask 603 with one end or outlet connected to the vacuum pump 604 and the inlet connected to the separation funnel 602 to add the desired 2-MBT solution (2 g 2-MBT in 10 g N-methyl-2-pyrrodinone (NMP) 601. After about 30 min of evacuation, the outlet connected to the vacuum pump 604 is blocked and excess 2-MBT solution is added into the flask 603 through the separation funnel 602. After about 30 min, the mixture is separated using a funnel lined with a filter paper. The residual 2-MBT solution is further absorbed away by putting some tissue paper on the outside of the filter paper. Etched HGBs loaded with anticorrosive essence are obtained and ready to be used in polymeric coatings for corrosion protection.

Figure 10:
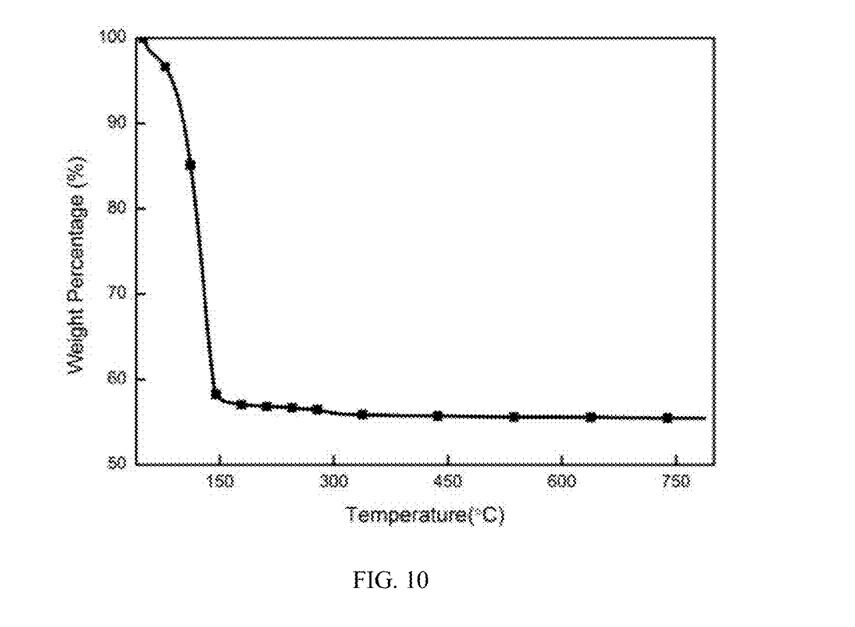
FIG. 10 is a thermogravimetric analysis (TGA) curve for etched HGBs containing an anti-corrosion species 8-hydroquinoline (8-HQ)

FIG. 10 shows the thermogravimetric analysis (TGA) curve for etched HGBs containing the anti-corrosion species 8-HQ. The first small sharp drop before 60° C. is due to evaporation of the residual solvent for 8-HQ, i.e., the acetone. The percentage of acetone evaporated is less than 5% of all the mass. The second big drop from around 60° C. to 150° C. is the sublimation of 8-HQ at elevated temperature. The content of 8-HQ is about 40 wt %. The undecomposed mass left is the etched HGBs that carried the evaporated/sublimated mixture. As can be seen from the TGA curve, the anti-corrosion species, 8-HQ, can be loaded in the etched HGBs in solid status.

Figure 11:
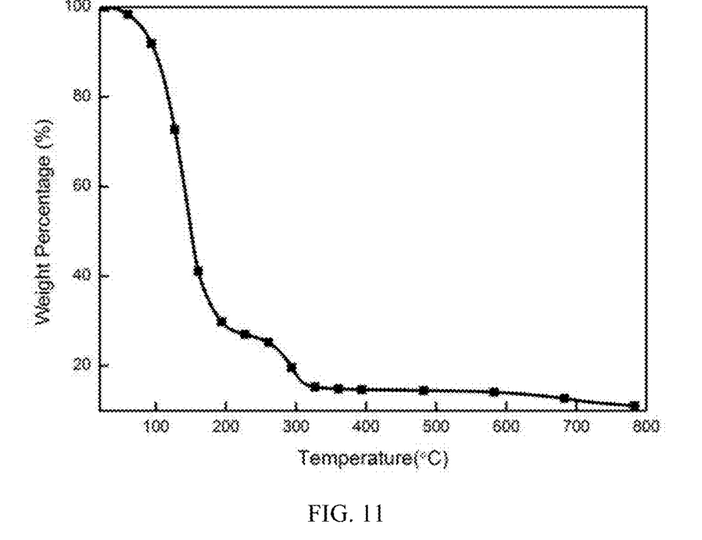
FIG. 11 is a TGA curve for etched HGBs containing the anti-corrosion species 2-mercaptobenzothiazole (2-MBT)

FIG. 11 shows the TGA curve for etched HGBs containing the anti-corrosion species 2-MBT. The first big drop from around 50° C. to 200° C. is the evaporation of the solvent for 2-MBT solution, i.e., the N-methyl-2-pyrrodinone (NMP). The percentage of NMP is about 72.5 wt %. The second drop from around 200° C. to 325° C. is the evaporation of 2-MBT. The percentage of 2-MBT is about 12.5 wt %. The residue is the undecomposed HGBs. The TGA curve verifies that the anti-corrosion species, 2-MBT, can be loaded in the etched HGBs in solution.

As mentioned earlier, other researchers have also explored to modify the permeability of HGB shells. However, they could only obtain a porous wall having nano-channels or subnano-channels through the shells (US20100139320). The problem with this kind of porous-walled HGBs is that it is difficult to fill the HGBs with desired solutions due to the small size of the nano- or subnano-channels created. Compared to the porous wall having only nano-channels, the small holes having diameters of a few microns on the shells of the etched HGBs in the present invention give high convenience for the filling of the etched HGBs with desired fillers.

The present invention thus introduces a new type of universal microcontainer featuring the inert nature of glass. These universal microcontainers of etched HGBs can be used for, but are not limited to, containing reactive healing agents and for the purpose of controlled release of various chemicals therefrom. Unlike traditionally adopted microcontainers for carrying healing agents for the purpose of self-healing that are synthesized and polymer-based, in this invention, the microcontainers for carrying healing agents, i.e. the etched HGBs, are made of inorganic glass. Compared to the polymer shell of previously synthesized microcapsules, the glass shell of the HGBs in the present invention is more robust and chemically inert, having holes with diameters at the micron level.

The application of the etched HGBs to the self-healing materials is tremendously superior over the traditional healing agents microcontainers. Firstly, this invention allows the preparation of the shell and the core separately for fabricating microcontainers carrying healing agents, comprising etching the HGBs followed by loading the etched HGB containers with a desired substance or reactive agent. With this technique, users are free to choose a large variety of core materials with desired types, viscosity, and reactivity to be loaded into the etched HGB containers. Compared to the previous microencapsulation process to directly prepare the microcontainers carrying healing agents, it is easier to adjust the core materials using a two-step method. Also, unlike the traditional two-step method using synthesized polymeric hollow microcapsules [9], the chemical inertness of the shell of the HGBs which are made of soda-lime-borosilicate glass put almost no restriction on the core substance to be carried in the etched HGBs, regardless of their properties such as corrosivity, reactivity, viscosity, etc. Furthermore, unlike the polymeric shell obtained from the traditional microencapsulation process, the glass shell of the etched HGBs is very robust, which means that most of them are able to survive during material or composite processing procedures. Another advantage is that complete homogeneous self-healing can be realized if the monomer for the matrix is adopted as the core material. In addition, the etched rough outer surface of the HGBs offer good interfacial bonding strength with most polymer matrices.

In addition, the applications of the etched HGBs are not limited to the area of self-healing materials. Given the inertness of the glass shell, potential applications include but are not limited to containing anti-corrosion species, for drug delivery, as catalyst vehicles, etc. When the etched HGBs are adopted for such purposes, the high filling capability of the individual HGB can carry much more target chemicals than traditionally synthesized nano-containers or subnano-containers having nano-channels or subnano-channels through their dense shell, which makes it very difficult for the loading and the release of essences from the cavity of such traditional nano- or subnano-containers. What is more, etched HGBs of the present invention can also carry solid chemicals by first loading them with a saturated solution and then evaporating the solvent, or by directly loading solids above their melting temperatures but below glass softening point. Most importantly, the raw materials of the HGBs themselves are commercially available in massive amounts at low prices, thereby providing great potential for the commercial application of the present technique.

Other potential applications of this universal microcontainer of etched HGBs include but are not limited to their use as catalysts, sensor materials, and for controlled release purposes of antibody, anticancer and antibacterial drugs. In conclusion, a wide variety of applications are expected of HGB universal microcontainers prepared via controllable etching with diluted HF solution in the specially designed system of this invention.

Whilst there has been described in the foregoing description exemplary embodiments of the present invention, it will be understood by those skilled in the technology concerned that many variations in details of design, construction and/or operation may be made without departing from the present invention. For example, instead of using HF in the etching solution 99, hydrofluorosilic acid ($H_2F_6Si$) or other known suitable chemicals may be used to etch the HGBs. In all the reactors, the drive force for the circulation of the HGBs in the reactor is not limited to stirring by the propeller. Other known driving means may also be used. Drying the etched HGBs may be performed at other suitable temperatures besides room temperature. Filling the HGBs with a desired substance using the vacuum assisted method may use other appropriate vessels suitable for vacuum evacuation of the HGBs therein besides the two-neck flask described above. The number of tubules provided on the separator between the sinking zone and the collection zone is not limited to one or two as described above but may comprise as many as would be appropriate depending on the size of the mixer. The propeller in FIGS. 3 and 4 need not necessarily be located at the top opening of the mixer in order to stir the solution, but can also be located elsewhere in the solution. As an alternative to the embodiment shown in FIG. 4, the apparatus may be equipped with more than one feeder for adding the HF solution or other appropriate etching agent.

REFERENCES

US20100139320, Hollow porous-wall glass microspheres and composition and process for controlling pore size and pore volume, Schumacher et al.
U.S. Pat. No. 6,518,330 B2, Autonomically healing composite material, White et al.
U.S. Pat. No. 4,637,990, Hollow porous microspheres as substrates and containers for catalysts and method of making them, Torbin et al.
U.S. Pat. No. 4,793,980, Hollow porous microspheres as substrates and containers for catalyst, Torbin et al.
[1] Akunets A A, Basov N G, Bushuev V S, Dorogotovtsev V M, Gromov A I, Isakov A I, et al. SUPER-HIGH-STRENGTH MICROBALLOONS FOR HYDROGEN STORAGE. International Journal of Hydrogen Energy. 1994; 19(8): 697-700.
[2] McIlroy D A, Blaiszik B J, Caruso M M, White S R, Moore J S, Sottos N R. Microencapsulation of a Reactive Liquid-Phase Amine for Self-Healing Epoxy Composites. Macromolecules. 2010; 43(4):1855-1859.

[3] Jin H, Mangun C L, Stradley D S, Moore J S, Sottos N R, White S R. Self-healing thermoset using encapsulated epoxy-amine healing chemistry. Polymer. 2012; 53 (2): 581-587.

[4] Yang J L, Keller M W, Moore J S, White S R, Sottos N R. Microencapsulation of Isocyanates for Self-Healing Polymers. Macromolecules. 2008; 41(24):9650-9655.

[5] Huang M, Yang J. Facile microencapsulation of HDI for self-healing anticorrosion coatings. Journal of Materials Chemistry. 2011; 21(30):11123-11130.

[6] Huang M, Zhang H, Yang J. Synthesis of organic silane microcapsules for self-healing corrosion resistant polymer coatings. Corrosion Science. 2012; 65(0):561-566.

[7] Miller I. Alkali etching of glass, in the issue of Pushing the Envelope published by the Ontario Building Envelope Council, 2011.

[8] Newell J D, Patankar S N, Edwards D B. Porous microspheres as additives in lead-acid batteries. Journal of Power Sources. 2009; 188(1):292-295.

[9] Xiao D S, Yuan Y C, Rong M Z, Zhang M Q. Hollow polymeric microcapsules: Preparation, characterization and application in holding boron trifluoride diethyl etherate. Polymer. 2009; 50(2):560-568.

The invention claimed is:

1. An apparatus for fabricating microcontainers, the apparatus comprising:
a mixer configured to contain a liquid and having a plurality of zones, the plurality of zones comprising:
a reaction zone configured to contain a solution of an etching agent and a plurality of hollow glass beads for etching of the hollow glass beads therein;
a sinking zone below and in fluid connection with the reaction zone and configured to allow separation of etched hollow glass beads from intact hollow glass beads therein by sinking of the etched hollow glass beads; and
a collection zone below and in fluid connection with the sinking zone and configured to collect the etched hollow glass beads therein while minimizing etching in the collection zone.

2. The apparatus of claim 1, wherein the reaction zone is provided with a stirrer configured to agitate the solution and the plurality of hollow glass beads.

3. The apparatus of claim 1, further comprising a separator configured to minimize flow of solution between the sinking zone and the collection zone, the separator having at least one tubule configured to allow passage of the etched hollow glass beads therethrough from the sinking zone to the collection zone.

4. The apparatus of claim 1, further comprising an outlet provided at the collection zone for removal of the etched hollow glass beads from the collection zone.

5. The apparatus of claim 1, further comprising a number of separation meshes and barriers configured to inhibit liquid circulation in the sinking zone.

6. The apparatus of claim 1, further comprising a liquid leveller configured to allow drainage of excess solution in order to maintain a level of the solution in the mixer.

7. A method of fabricating microcontainers, the method comprising the steps of:
etching a plurality of hollow glass beads in a solution of an etching agent in a reaction zone of a mixer;
separating etched hollow glass beads from intact hollow glass beads in a sinking zone of the mixer by allowing the etched hollow glass beads to sink in the solution; and
collecting the etched hollow glass beads in a collection zone of the mixer while minimizing etching in the collection zone.

8. The method of claim 7, further comprising agitating the solution and the plurality of hollow glass beads during the step of etching.

9. The method of claim 7, further comprising minimizing flow of solution between the sinking zone and the collecting zone via a separator provided in the mixer and passing the etched hollow glass beads through a tubule of the separator from the sinking zone to the collection zone.

10. The method of claim 7, further comprising inhibiting liquid circulation in the sinking zone during the step of separating.

11. The method of claim 7, further comprising draining excess solution in order to maintain a level of the solution in the mixer.

12. The method of claim 7, further comprising rinsing the collected etched hollow glass beads to remove residual etching agent and drying the etched hollow glass beads.

13. The method of claim 7, further comprising filling the etched hollow glass beads with a desired substance.

14. The method of claim 13, wherein the step of filling comprises vacuum evacuating the etched hollow glass beads in a vessel, adding the desired substance as a solution into the vessel containing the vacuum evacuated etched hollow glass beads to form a mixture, and filtering the mixture to obtain the microcontainers comprising etched hollow glass beads filled with the desired substance.

15. The method of claim 13, wherein the step of filling comprises adding the etched hollow glass beads into a vessel containing a solution of the desired substance, allowing the solution of the desired substance to enter the etched hollow glass beads, removing etched hollow glass beads that have been filled with the solution of the desired substance from the vessel, and evaporating a solvent of the solution of the desired substance to obtain microcontainers comprising etched hollow glass beads filled with the desired substance.

* * * * *